United States Patent [19]

Anderson

[11] 4,276,783
[45] Jul. 7, 1981

[54] LIGHTWEIGHT MOUNTED CAMSHAFT POST

[75] Inventor: Dale W. Anderson, Livonia, Mich.

[73] Assignee: Ford Motor Company, Dearborn, Mich.

[21] Appl. No.: 50,944

[22] Filed: Jun. 21, 1979

[51] Int. Cl.³ ............................................ F16H 37/12
[52] U.S. Cl. ..................................... 74/15.63; 74/467;
403/259; 403/260; 403/404; 29/526 R;
123/90.34
[58] Field of Search ................... 74/15.6, 15.63, 15.66,
74/467, 15.69, 468; 474/91, 152, 202; 29/6,
156.4 R, 526 R; 403/337, 259, 260, 404;
123/90.31, 90.34

[56] References Cited

U.S. PATENT DOCUMENTS

| 259,554 | 6/1882 | Knight . | |
|---|---|---|---|
| 807,731 | 12/1905 | Dodge . | |
| 1,170,057 | 2/1916 | Farnum . | |
| 1,186,434 | 6/1916 | Pierce . | |
| 1,194,767 | 8/1916 | Mulvihill . | |
| 1,228,265 | 5/1917 | Unger . | |
| 1,237,443 | 8/1917 | Aldrich . | |
| 1,483,817 | 2/1924 | Landry . | |
| 1,497,503 | 6/1924 | Greuter | 123/90.34 X |
| 1,502,083 | 7/1924 | Zoelly . | |
| 1,680,328 | 8/1928 | Eicher | 74/467 X |
| 2,552,724 | 5/1951 | Lang | 74/567 |
| 2,972,903 | 2/1961 | Lee | 74/468 |
| 3,352,293 | 11/1967 | Holten . | |
| 3,364,776 | 1/1968 | Callahan | 74/467 |
| 3,424,022 | 1/1969 | Greenberg et al. . | |
| 3,495,471 | 2/1970 | Johnson | 74/467 |
| 3,834,248 | 9/1974 | Caliri | 74/467 X |
| 3,958,541 | 5/1976 | Lachnit | 123/90.34 |

Primary Examiner—C. J. Husar
Assistant Examiner—Moshe I. Cohen
Attorney, Agent, or Firm—Steven L. Permut; Clifford L. Sadler

[57] ABSTRACT

A camshaft post assembly is mounted onto an axial end of a camshaft and axially extends therebeyond. The camshaft post has an outwardly extending rim which has a sprocket ring mounted thereon and an eccentric pilot surface with a fuel pump cam mounted thereon and at its outer axially end a helical distributor gear frictionally locked thereon. The cam post has internal passages for lubricant which allows an oil pump to pumpoil therethrough which passes the oil through the camshaft, through the cam post, and through outlets which centrifugally spray oil onto the sprocket ring and distributor gear.

10 Claims, 11 Drawing Figures

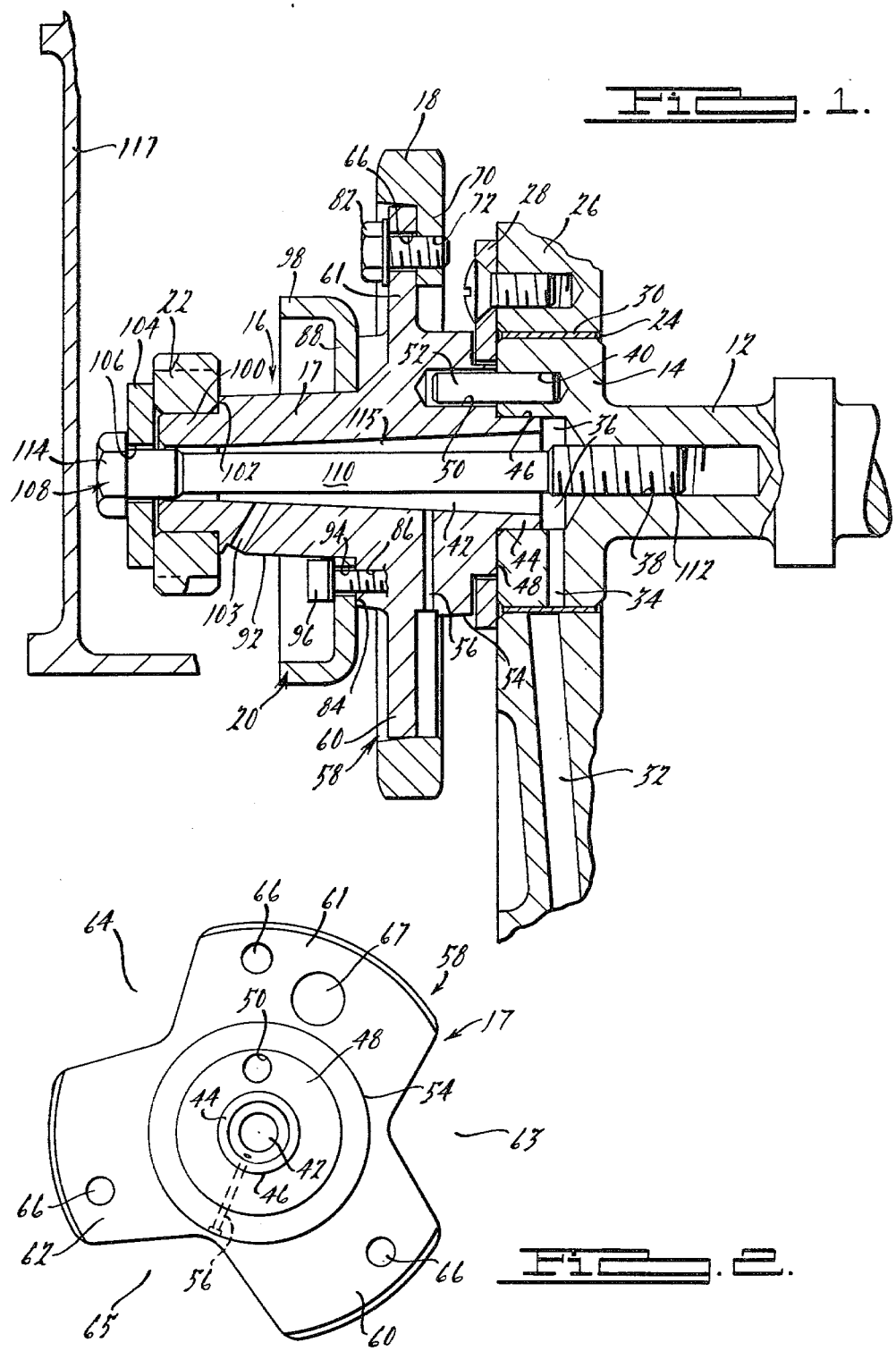

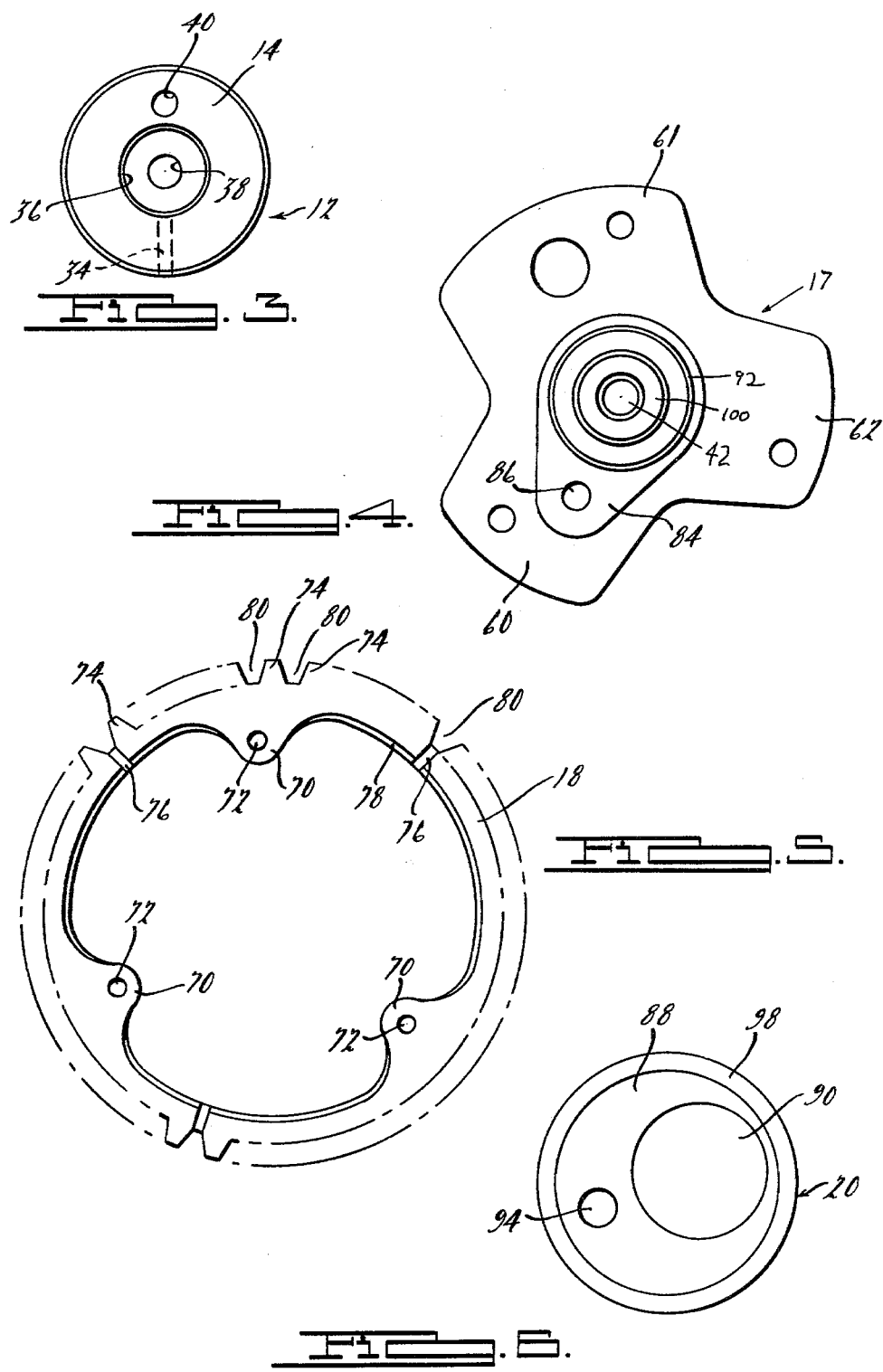

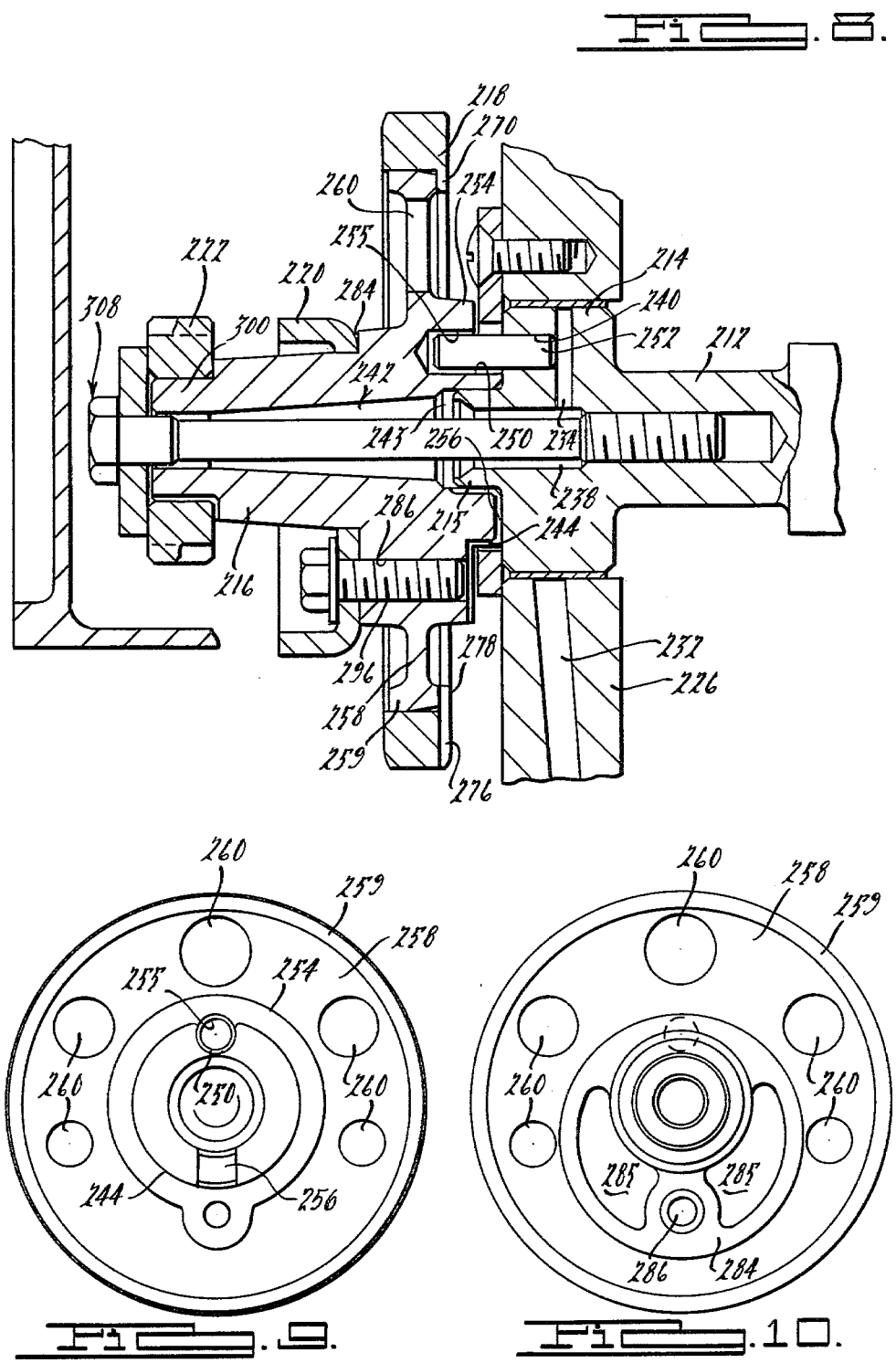

LIGHTWEIGHT MOUNTED CAMSHAFT POST

BACKGROUND OF THE INVENTION

1. Field of the Invention.

This invention relates to a camshaft post which is mounted onto a camshaft, and more particularly, to a camshaft post that has a positive lubrication system therein.

2. Description of Prior Art.

Camshafts for operating the valves of an internal combustion engine are normally gear or chain driven by the engine's crankshaft. In some engines, the ignition distributor is connected by gearing to the camshaft. A camshaft post is a device for securing a gear or chain sprocket to the end of the camshaft. Camshafts have been driven by crankshafts by chain sprockets mounted directly onto the camshafts and crankshafts and a chain trained about both sprockets. In addition, camshafts have been drivingly connected to distributors by the use of distributor gears also mounted onto camshafts. In addition, it has also been known to use a lubricating oil system which directs oil onto the sprocket and distributor gears. Such lubricating systems are shown in U.S. Pat. Nos. 1,228,264 to Unger, issued on May 29, 1917; 1,497,503 to Greuter, issued on June 10, 1924, and 3,352,293 to Hulter, issued Nov. 14, 1967.

In addition, it has also been known to use a composite sprocket with the tooth ring section bolted onto an intermediate hub section. Such a device is disclosed in U.S. Pat. No. 2,972,903 issued to Lee on Feb. 28, 1961.

In the prior art, the camshaft forms an integral post section with gear rings and sprocket rings attached thereabout. In the area of automotive engineering which is concerned with excessive weight of an automobile, efforts have been made to eliminate any unnecessary heavy steel or cast iron. The use of iron or steel is desired for operating cams on a camshaft but is unnecessary for use in rotating the distributor and sprockets attached onto the camshaft. As such it is desirable to shorten the heavy metal camshaft so that any unnecessary steel or cast iron is eliminated and to attach a post onto the camshaft which comprises a light weight material that forms the hub of both the distributor and the chain sprocket.

SUMMARY OF THE INVENTION

According to the invention, a lightweight camshaft post assembly includes a camshaft with a camshaft post made from a material with a specific gravity less than a camshaft, mounted on the end of the camshaft, and extending axially therebeyond. The post has a radially extending flange portion with a sprocket ring attached onto the periphery of the flange.

In one embodiment, a distributor gear is also attached onto the axially outer end of the post.

Further, according to the invention, one embodiment includes a threaded bolt passing axially through a central aperture of the post and threadably engaging a hole in the end of the camshaft. The bolt has a head which presses against the post to secure the post against the camshaft end. In addition, a dowel pin is received in aligned off-centered apertures in the camshaft and post for preventing relative rotation of the camshaft and post.

Preferably, the camshaft has a radially extending inlet port leading from an outer surface to the central hole near the end of the camshaft. A portion of the central aperture through the post and camshaft forms a clearance about the bolt therein. The clearance is in fluid communication with the inlet port and also in fluid communication with axially outward and radially extending ports in the post leading from the central aperture to an outer surface of the post in proximity to the sprocket ring and distributor gear such that centrifugal force acting upon lubricant flowing through the outlets will allow lubricants to radially spray outwardly and strike against the sprocket and distributor gear.

BRIEF DESCRIPTION OF THE DRAWINGS

Reference will now be made to the following drawings in which:

FIG. 1 is a side elevational and segmented view of a camshaft post assembly according to one embodiment of the invention;

FIG. 2 is a rear elevational view of the camshaft post member shown in FIG. 1;

FIG. 3 is a front elevational view of the camshaft shown in FIG. 1;

FIG. 4 is a front elevational view of the camshaft post member shown in FIG 1;

FIG. 5 is a rear elevational view of the sprocket ring shown in FIG. 1;

FIG. 6 is a front elevational view of the eccentric fuel pump cam shown in FIG. 1;

FIG. 8 is a side elevational and segmented view of a further modified camshaft post assembly according to a third embodiment of the invention;

FIG. 9 is a rear elevational view of the campost shown in FIG. 8;

FIG. 10 is a front elevational view of the campost shown in FIG. 8; and

DETAILED DESCRIPTION OF THE PREFERRED EMBODIMENTS

Figure 7:
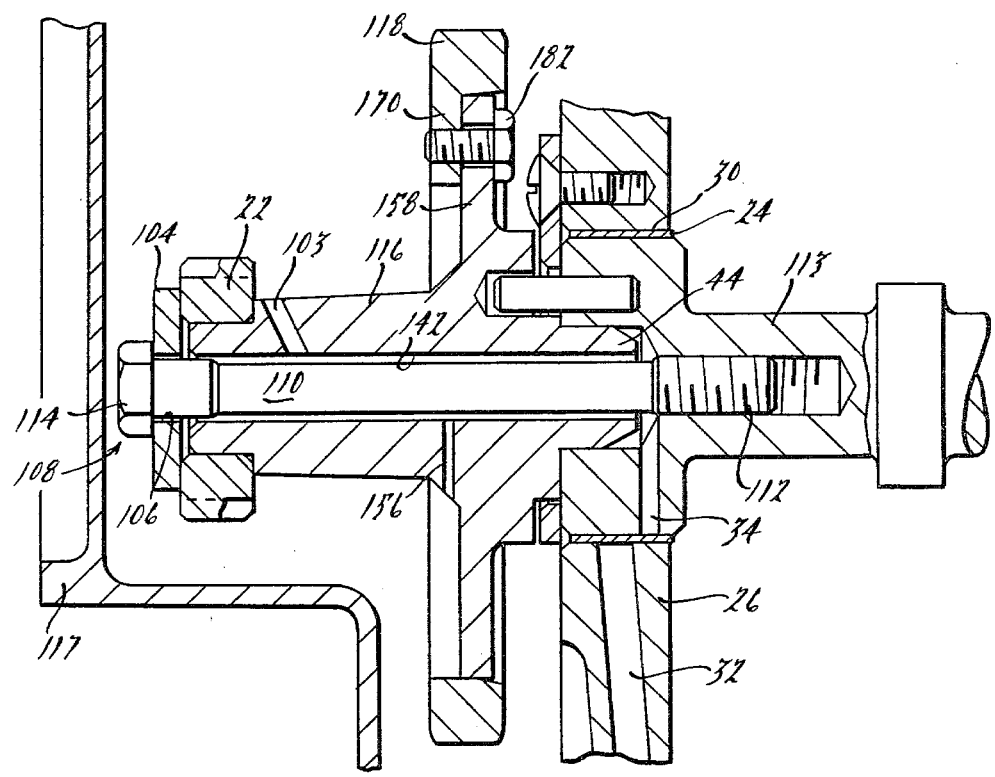
FIG. 7 is a side elevational and segmented view of a modified camshaft post assembly according to a second embodiment of the invention.

Referring to FIG. 1, a camshaft 12 has a camshaft post assembly 16 mounted at the forward end 14 of camshaft 12. The post assembly 16 incudes a post member 17 with a sprocket ring 18, fuel pump cam 20, and distributor drive gear 22 mounted thereon.

Referring to FIGS. 1 and 3, the camshaft 12 has an end 14 journaled within an aperture 24 of engine block 26. This structure forms part of an internal combustion engine such as may be used in an automobile. A thrust plate 28 is mounted on the exterior side of the engine block 26 and partially overlaps aperture 24 to prevent axial displacement of the camshaft 12. Bearings 30 are placed in aperture 24 between the cam end 14 and the engine block 26. An oil lubricant passage 32 is in communication with the bearings 30. In addition, an inlet 34 radially passes through journaled end 14 to an axially extending central aperture 36 within journaled end 14. In addition, the camshaft 12 has a threaded aperture section 38 axially extending from central aperture 36. An aperture 40 also extends axially in journaled end 14 radially displaced from central aperture 36.

Referring now to FIGS. 1 and 2, the camshaft post member 17 has a central aperture 42 which is tapered radially inwardly toward the axial front end thereof. At the rear end, reduced diameter section 44 has a cylindrical surface 46 fitting within aperture 36 of the camshaft 12. A radially outwardly extending shoulder 48 has an axially extending aperture 50 therein which is aligned with aperture 40 in the camshaft 12. A dowel pin 52 extends into apertures 40 and 50 and nonrotatably locks the camshaft post 17 with the camshaft 12.

The post 17 has a second outer cylindrical surface 54. An outlet 56 radially extends from tapered aperture 42 through the cylindrical surface 54. The post 17 has a radially extending flange 58 divided into three circumferentially spaced segments 60, 61 and 62 with notches 63, 64 and 65 spaced therebetween. Each flange segment has a bolt hole 66 therethrough. Flange 61 is larger than either flanges 60 and 62 and has a weight balancing aperture 67 therethrough.

Referring now to FIGS. 1 and 5, the sprocket ring 18 has a plurality of spaced teeth 74 with a plurality of grooves 76 extending from the inner surface 78 of the ring 18 to a notch 80 formed between two adjacent teeth 74. The sprocket ring has three radially inwardly extending ears 70 each with an aperture 72. Each hole 72 is threaded and aligned with one of the bolt holes 66 in camshaft post 17 such that a bolt 82 as shown in FIG. 1 can extend through bolt hole 66 and threadably engage bolt hole 72 to bolt sprocket ring 18 onto the flange 58. In addition, notches 63, 64 and 65 between the flange segments 60, 61 and 62 are sized to allow the ears 70 of sprocket 18 to axially pass therethrough when the sprocket ring 18 is disengaged from the flange 58 and rotated to align the ears 70 with the notches 63, 64 and 65. Such disengagement occurs when one desires to remove the chain and sprocket ring from the cam post assembly 16.

As shown in FIGS. 1 and 4, an eccentric pilot shoulder 84 is integrally formed as the front surface of the flange 58. The shoulder 84 has a threaded aperture 86 therein. The eccentrically mounted pilot shoulder 84 abuts the fuel pump cam 20.

As shown in FIGS. 1 and 6, the fuel pump cam 20 has a central disc portion 88 with an eccentrically placed aperture 90 therethrough sized to receive a tapered section 92 of the campost 17. A second aperture 94 in fuel pump cam 20 is aligned with threaded aperture 86 in shoulder 84 such that a bolt 96 can threadably engage shoulder 84 and clamp the disc portion 88 against the outwardly extending pilot shoulder 84. The fuel pump cam member 20 has a cylindrical axially extending rim 98 which is integral with the disc section 88 and is eccentric with respect to the central axis of the campost.

Referring back to FIG. 1, a helical drive gear 22 is placed on a forward reduced diameter end and abutting shoulder 102 of campost member 17. The helical gear 22 has a greater thickness than the axial length of nub 100 such that it extends slightly beyond the nub 100. A washer 104 abuts the helical drive gear 22. The washer 104 has an aperture 106 which is aligned with the tapered aperture 42 through campost 17. A second lubricant passage or outlet 103 extends from central aperture 42 and is directed toward the distributor gear 22.

A bolt 108 has a shaft portion 110 with a threaded end 112 and a head 114. The bolt 108 is sized to be received within the aperture 106 of washer 104, tapered aperture 42 of camshaft post 16, and threadably engaging aperture 38 within camshaft 12. As the bolt is tightened into section 38, the head 114 presses against washer 104 which presses the helical gear 22 and locks it onto nub 100 and also presses and secures the camshaft post 17 onto the camshaft 12. An annular clearance 115 exists between bolt shaft 110 and the surface of aperture 42. A protective cover 117 can be attached to the engine block 26 to cover the assembly.

In operation, a chain (not shown) engages the teeth 74 of the sprocket ring 18 to rotate the camshaft post and the camshaft. As the camshaft 12 and camshaft post assembly 16 turn, lubricant under pressure is introduced within passage 32 to the bearings 30. The lubricant is engine oil and the passage 32 is in communication with the engine's oil pump by means of the inlet passage 34. Some of the lubricant is introduced into inlet 34 which passes lubricant into the central aperture 36 of camshaft 12. The lubricant will pass through the clearance 115 and through the outlets 56 and 103. Upon rotation of the camshaft and campost assembly, centrifugal forces direct the lubricants outward onto the helical distributor gear 22 and onto sprocket ring 18. The grooves 76 within sprocket ring 18 allow the lubricant which lands on the inner periphery 78 to centrifugally pass outward onto the teeth 74 which are in contact with the sprocket chain (not shown).

Referring now to FIG. 7, in a second embodiment according to the invention, a post 116 has a straight central aperture 142. The campost 116 has an outwardly extending integral circular flange 158. On the axially outer side of flange 158, the sprocket ring 118 has its inwardly extending ears 170 attached on the axially outer end of flange 158 by bolts 182. No fuel pump cam is mounted onto post 116. Outlet passage 156 directs lubricant to the axial outer side of flange 158. A camshaft 113 is essentially the same as the camshaft 12 in the first embodiment.

Referring now to FIGS. 8, 9, 10 and 11, a third embodiment according to the invention has a camshaft 212 with a radially extending shoulder 214 which has an axially extending reduced diameter end 215. Lubricant inlet passage 234 is in communication with oil passage 232 in engine block 226. In addition, the camshaft 212 has a central aperture 238 which provides a lubricant passage connected to inlet 234. The campost 216 has an internal tapered central aperture 242 which opens to a wider cylindrical section 243 which receives the end 215 of the camshaft 212.

As shown in FIGS. 9 and 10, the post 216 has an outwardly extending circular flange 258 with a thickened outer circular rim 259. The flange 258 has a plurality of weight saving apertures 260 therethrough. The apertures 260 can be of different sizes and positioned to appropriately balance the campost.

As shown in FIGS. 9 and 10, a shoulder section 244 has a notch 250 which is aligned with an aperture 240 in the camshaft shoulder 214 to receive a dowel pin 252. A second outwardly extended shoulder 254 has an aperture 255 therein to receive the axially outer end of dowel pin 252. In addition, a groove 256 forms a passage from the tapered central aperture 242 past the radial shoulder 244 such that oil passes from the central aperture 242 through the passage and onto the sprocket ring 218.

As shown in FIG. 10, the campost has a pilot shoulder rim 284 with weight saving cavities 285 therein. In addition, the pilot surface 284 has threaded aperture 286 therethrough. The pilot rim 284 is eccentric with respect to the central aperture 242 through the post 216.

Fuel pump cam 220 is bolted onto pilot surface 284 by bolt 296. The distributor gear 222 is frictionally locked onto nub 300 in the same fashion as the other two embodiments. Bolt 308 passes through the aperture 242 in the same fashion to threadably engage the threaded section 238 of camshaft aperture 236.

Figure 11:
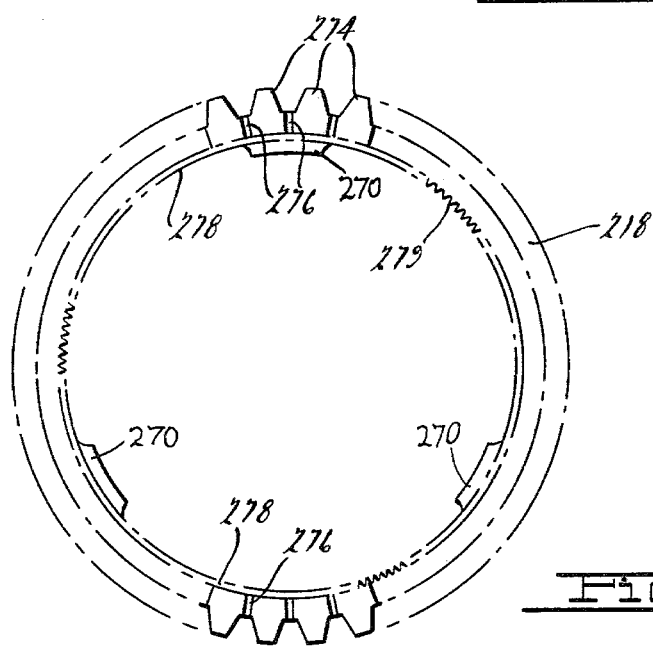
FIG. 11 is a front elevational view of the sprocket ring shown in FIG. 8.

Referring to FIG. 11, the sprocket ring 218 has inwardly extending tabs 270 and a plurality of spaced teeth 274 with grooves 276 extending from the inner periphery 278 spaced therebetween. Serrations 279 nonrotatably secure the sprocket ring 218 onto the outer rim 259 of flange 258 when the sprocket ring 218 is pressed thereon.

It should be understood the foregoing embodiments of the present invention are merely illustrative of the preferred practice of the present invention and the various changes and modifications may be made in the arrangements and details of construction of the embodiments described herein without departing from the spirit and scope of the present invention.

The embodiments of the invention in which an exclusive property or privilege is claimed are claimed as follows:

1. A camshaft post assembly comprising:
   a camshaft and a camshaft post connected thereto;
   said camshaft post comprising a material having a specific gravity less than the camshaft;
   said post mounted on the end of the camshaft and axially extending beyond the camshaft;
   said post including a radially extending flange portion, a toothed sprocket ring attached about the outer periphery of said flange portion, and means for securing said post to said end of said camshaft.

2. A camshaft post assembly as defined in claim 1 wherein said radially extending flange is divided into three circumferentially spaced segments;
   each segment is secured to said sprocket ring;
   said sprocket ring has three radially inwardly extending attaching flanges for attachment to respective flange segments;
   said flanges are alignable with said spaces such that said lobes may axially pass through the spaces between the flange segments of said post to facilitate ease in mounting and dismounting said sprocket ring onto said post.

3. A camshaft post assembly as defined in claim 1 further comprising a distributor gear secured onto the axially outer end of said camshaft post and constructed to be drivingly connected to the ignition distributor for an engine.

4. A camshaft post assembly as defined in claim 1 wherein said securing means includes a threaded bolt passing through an axially extending central aperture through said post and threadably engaging a hole in the axial end of said camshaft;
   said bolt having a head pressing the post against an outer end of said camshaft;
   a dowel pin received in aligned off-centered apertures of said camshaft and said post for preventing relative rotation of said post with respect to said camshaft.

5. A camshaft post assembly as defined in claim 3 wherein said post has an axially inwardly extending reduced diameter end sized to be snugly received in a recessed shoulder section of said camshaft about said aligned central hole of said camshaft.

6. A camshaft post assembly as defined in claim 4 wherein said central aperture through said post is tapered toward said axial outer end of said post.

7. A camshaft post assembly as defined in claim 4 further comprising a lubricating means for lubricating said sprocket comprising an inlet port extending radially inwardly from an outer surface of said camshaft to the central hole at the axial end of said camshaft;
   said bolt and said central aperture through said post providing a clearance therebetween for fluid communication with said inlet port;
   an outlet port radially extending through said post from said central aperture to an outer surface of said post;
   said outer end of said outlet port being in axial proximity to said sprocket ring such that centrifugal forces acting upon lubricant cause such lubrication to flow through said lubricating means, and radially outwardly onto said sprocket ring.

8. A camshaft post assembly as defined in claim 7 further comprising:
   a distributor gear secured onto the axially outer end of said camshaft post;
   said lubricating means further comprising a second outlet port radially extending through said post from said clearance between said post and bolt to an outer surface of said post;
   said radial outer end of said outlet in axial proximity to said distributor gear such that upon centrifugal forces acting upon lubricant exiting from said outlet, said lubricant radially sprays outwardly and onto said distributor.

9. A camshaft post assembly defined in claim 7 wherein said distributor gear is mounted onto a narrowed axially outer end of said post;
   said post having a shoulder radially extending outwardly from said outer end with said shoulder abutting a side of said distributor gear;
   said axial length of said distributor gear greater than the axial length of said narrowed outer end of said port;
   said shaft extending through an aperture in a washer;
   said washer having an outer diameter greater than said narrowed outer end and less than said outer diameter of said distributor gear;
   said washer abutting said head of said shaft on one side and said distributor gear on its other side with said distributor gear frictionally locked between said washer and said axially extending shoulder.

10. A camshaft post assembly as defined in claims 3 or 8 further comprising a fuel pump cam with an eccentric aperture therethrough mounted on said post;
    said post extending through said fuel pump cam and having an outwardly extending shoulder section to abut and position said fuel pump cam;
    a bolt extending through at a radially spaced hole in said fuel pump cam and threadably engaging an aperture in said shoulder of said post.

* * * * *